United States Patent [19]
Pfefer

[11] 3,768,748
[45] Oct. 30, 1973

[54] BULK FILM LOADER
[76] Inventor: Irving Pfefer, 6232 Atoll Ave., Van Nuys, Calif.
[22] Filed: Oct. 1, 1971
[21] Appl. No.: 185,676

[52] U.S. Cl. ............................................. 242/71.7
[51] Int. Cl. ......................................... G03b 17/26
[58] Field of Search..................... 242/71.7; 95/90.5

[56] References Cited
UNITED STATES PATENTS
| | | | |
|---|---|---|---|
| 2,082,962 | 6/1937 | Lesjak et al. | 95/90.5 |
| 2,239,188 | 4/1941 | Boes | 242/71.7 X |
| 2,298,339 | 10/1942 | Boes | 242/71.7 X |

*Primary Examiner*—George F. Mautz
*Assistant Examiner*—John M. Jillions
*Attorney*—Harris et al.

[57] ABSTRACT

A bulk film loader for loading photographic film from a supply spool into a cassette for use in a camera, including a case divided into a bulk film compartment for retaining the supply spool and a cassette compartment for retaining a cassette, an access door for the cassette compartment, means for closing communication between the compartments when the door is open and opening such communication when the door is closed, and means for winding film from the spool into the cassette when the door is closed.

8 Claims, 10 Drawing Figures

PATENTED OCT 30 1973
3,768,748
SHEET 1 OF 2
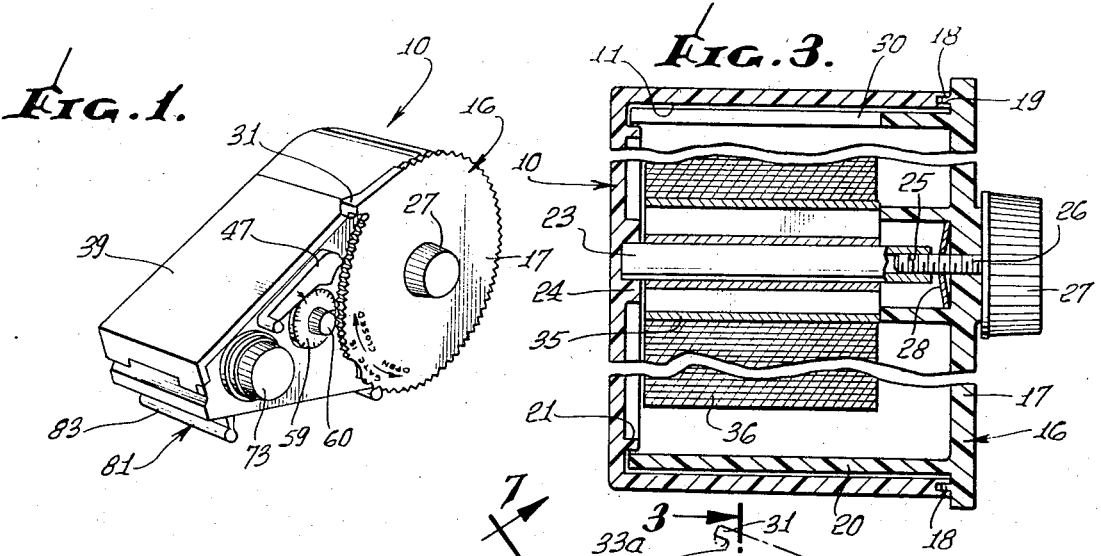
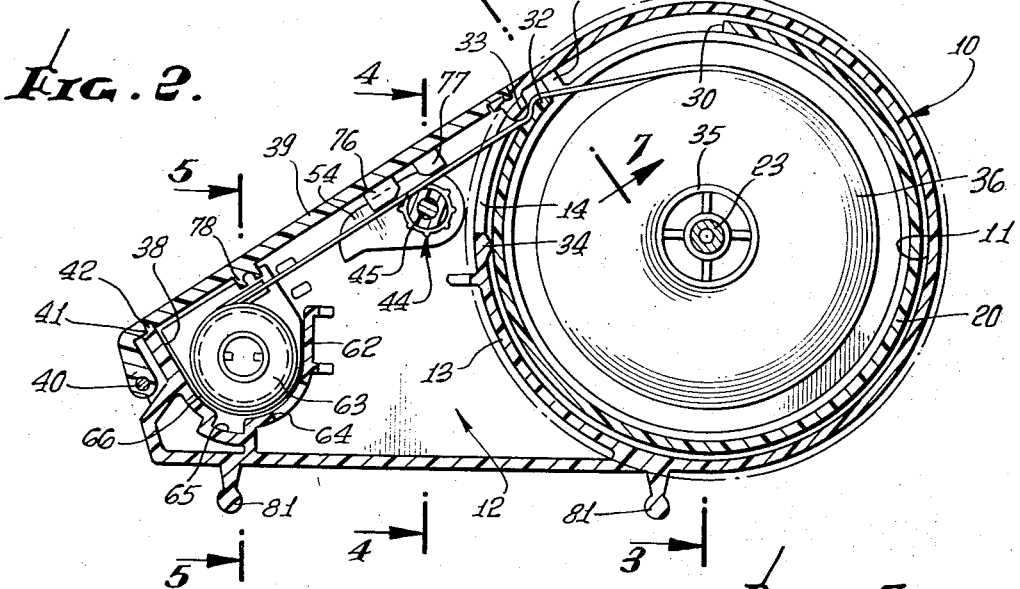
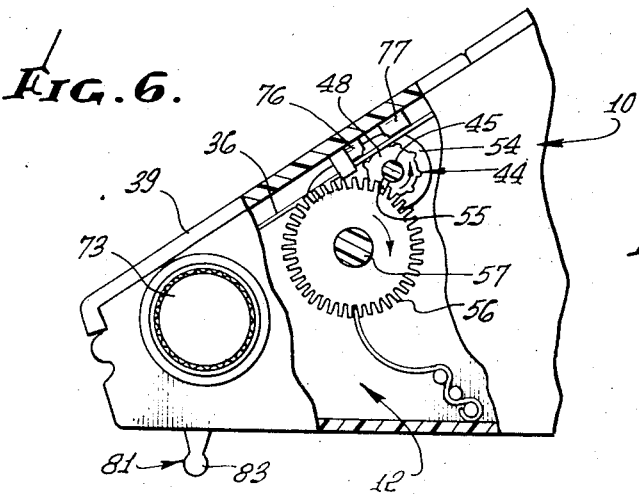
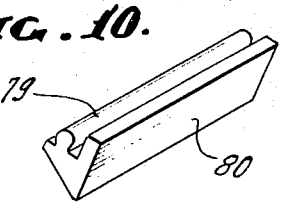

PATENTED OCT 30 1973 3,768,748
SHEET 2 OF 2
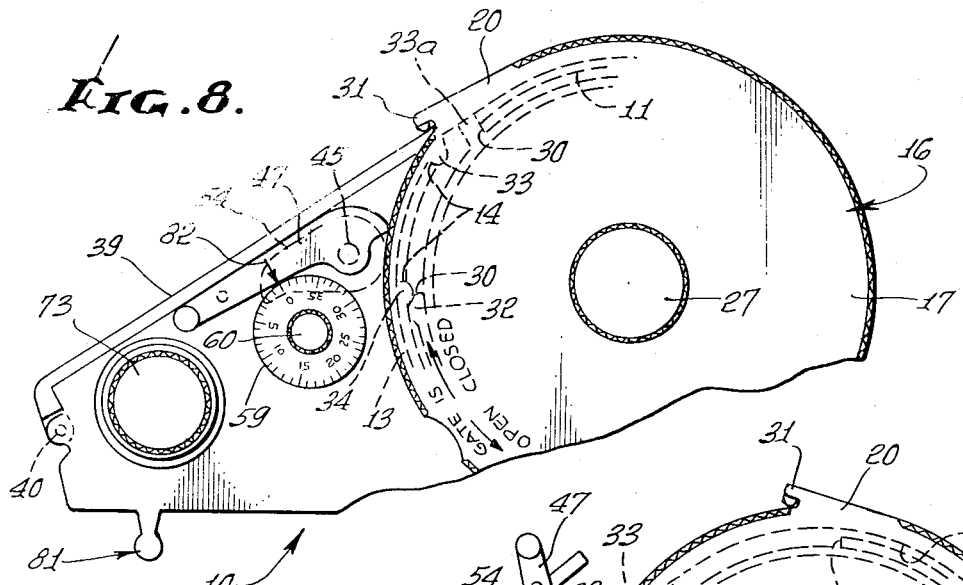
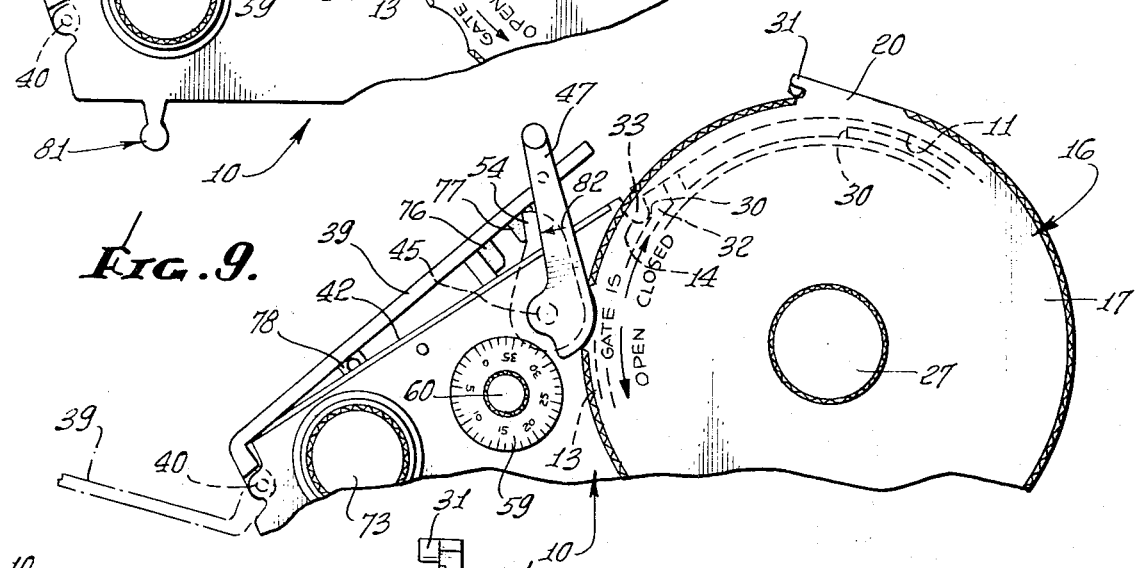
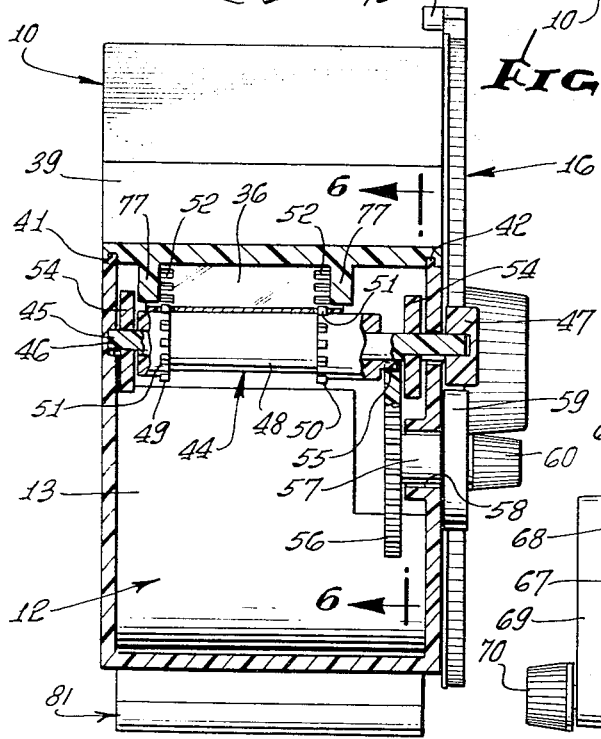
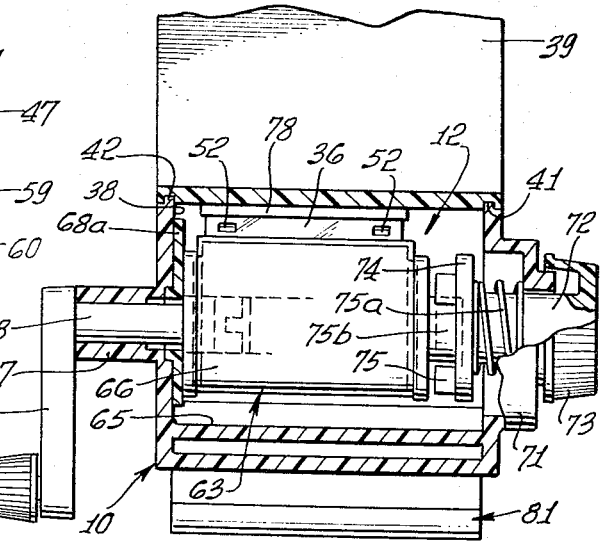

BULK FILM LOADER

BACKGROUND OF INVENTION

Bulk film loaders for winding photographic film from a supply spool onto the spool of a cassette, in the daylight, are old in the art. Such a device is shown and described in U.S. Pat. No. 2,239,188, issued to W. W. Boes. Such a bulk film loader is exemplified by the Model 66 Watson "35 mm Day-Lite Film Loader" heretofore sold by Burke & James, Inc., Chicago 4, Illinois, which is the bulk film loader most nearly similar to the present invention known to applicant.

Such prior art bulk film loaders had many disadvantages which it is a primary object of the present invention to obviate. For example, they were difficult to take apart, the operation involving a number of separate parts. The film in passing from a supply compartment to a cassette compartment had to follow a devious path, contacting inner parts of the loader, which resulted in undesirable scratching of the surface of the film. The light baffling between the supply compartment and the cassette compartment was poor and frequently allowed light to fog the film in the supply compartment when the cassette compartment was open. The cassette compartment and means for supporting a cassette therein were poorly designed, only adapted to accept one or two types of cassettes, and frequently the cassette would jam, causing the access door to the cassette compartment to open inadvertently to cause undesirable fogging of the film. In most of such loaders the film passed over a rotatable sprocket for guiding the film, having an exposure counter connected thereto, and guides in the case were inadequate to hold the film in positive engagement with the sprocket as it passes thereover, as is required for accurate operation of the counter. In such prior art loaders it was often possible to move the film between the supply compartment and the cassette compartment when the gate therebetween was thought to be closed, with attendant undesirable scratching of the film. In many there was no means for indicating to the operator when the light-tight gate between the supply and cassette compartments was fully open or fully closed, which was undesirable. It was possible to open the access door to the cassette compartment when the gate between the compartments was not fully closed, causing undesirable fogging of the film. It was possible to open the gate between the compartments when the access door to the cassette compartment was open, causing undesirable fogging of the film in the supply compartment.

The film loader of the present invention not only obviates the foregoing disadvantages of the prior art, but has other objects, advantages, and features which will appear hereinafter.

SUMMARY AND OBJECTS OF INVENTION

The bulk film loader of the present invention includes a hollow case, divided into a film supply compartment adapted to rotatably receive a roll or reel of bulk film, and a cassette compartment adapted to receive a film cassette, with means for supporting, opening, and closing the cassette and rotating its spool from the exterior of the case. An access door is provided for the cassette compartment of the case, which door may be opened or closed to provide access to the cassette compartment for insertion or removal of a cassette when the door is opened and to render the compartment light-tight when the door is closed. One end of the supply compartment of the case is open and receives a generally tubular cover to close such opening in the case, the tubular side wall of the cover having a slot and the cover being rotatable relative to the case to position such slot between the supply and cassette compartments to permit film to be moved from the supply compartment into the cassette compartment, or to position such slot out of registry between the compartments to render the supply compartment light-tight. The cover is removable from the case to permit insertion or removal of a spool of bulk film into or from the supply compartment. In the cassette compartment is a sprocket over which the film travels from the bulk film spool to the cassette, to rotate the sprocket, the sprocket being connected to a counter on the exterior of the case, the counter counting the number of frames of film wound over the sprocket to indicate the degree of filling of the cassette with film. Means are provided on the exterior of the case for opening or closing a cassette received in the cassette compartment, and means are likewise provided on the exterior of the case for rotating the spool of the cassette to wind film onto it from the bulk film spool in the supply compartment.

In my film loader, the film passes from the film supply spool over the sprockets, to the cassette spool, when the gate therebetween is open, without touching any other parts of the device, to avoid scratching of the film, and this is an important object of the invention.

In my film loader, guides are provided on the access door of the cassette compartment for guiding the film in its passage from the film supply spool to the cassette and holding it in positive engagement with the sprocket, and this is a further object of the invention.

Interengaging ribs are provided on the case and on the cover for the film supply compartment to form a brake on the film when the gate is closed, to prevent movement of the film when the gate is closed, and to form a light-tight baffle when the gate is closed, and this is another object of the invention. Such ribs also operate to displaceably lock the cover in its position in which the gate is fully opened, and such ribs act as indicators to the operator to indicate when the gate is fully open or closed, which is a further object.

The access door to the cassette compartment is hinged to the case at its forward end, to eliminate the possibility of its being opened by mischance, and this is a further object of the invention.

My loader includes a cam lever on the exterior of the case, having elements on the inside of the cassette compartment engageable with the access door for opening it when the lever is moved. Such lever engages the cover when the cover is in its open position, to prevent actuation of the lever in such position, preventing opening of the door when the gate is open. The lever when moved to its position in which it opens the access door also engages the cover to prevent it being moved from its closed position while the access door is open. These are further objects of the invention.

THE DRAWINGS

FIG. 1 is a perspective view of the bulk film loader of this invention, with the parts in their respective positions for normal winding of film through the loader;

FIG. 2 is a vertical section through the film loader of FIG. 1;

FIG. 3 is a cross-sectional view taken on the line 3—3 of FIG. 2;

FIG. 4 is a cross-sectional view taken on the line 4—4 of FIG. 2;

FIG. 5 is a cross-sectional view taken on the line 5—5 of FIG. 2;

FIG. 6 is a view, partly in section, taken on the line 6—6 of FIG. 4;

FIG. 7 is a fragmentary sectional view taken on the line 7—7 of FIG. 2;

FIG. 8 is a side elevational view of the near side of the loader of FIG. 1;

FIG. 9 is a view similar to FIG. 8 but showing the parts in a second position of operation; and FIG. 10 is a perspective view of a leveling block of the invention.

DETAILED DESCRIPTION

Referring to the drawings, the invention includes a main case 10, formed of plastic or other light-impenetrable material, which is divided into a generally circular bulk film compartment 11 and a cassette compartment 12, separated from each other by a semicircular wall 13 having a transverse film slot 14 therein. As best shown in FIGS. 1, 2, and 3 the outer end of the bulk film compartment 11 is open and receives a film compartment cover 16 having a generally circular outer plate 17 provided on its inner face with a circular lip 18 adapted to fit into a circular groove 19 in the main case 10 to serve as a guide means for guiding the rotation of the cover relative to the case and forming a light-tight joint therebetween. The cover 16 is provided with a cylindrical wall 20 which extends into the bulk film compartment 11, being centered therein by an annular rib 21 formed on the case. In the bulk film compartment 11 is a spindle 23 press-fitted or otherwise rigidly secured in a boss 24 on the inside of the bulk film compartment, the outer end of the spindle being threaded at 25 to receive a screw 26 which extends through the outer plate 17 and has rigidly connected thereto a knurled knob 27 for rotating the screw into or out of the spindle. Carried on the screw 26 is a spring washer 28 which secures the screw 26 and knob 27 to the cover 16, but permits relative movement therebetween, limiting movement of the screw into the spindle or outwardly therefrom. As best shown in FIG. 2, the cylindrical wall 20 is provided with a transverse film gate 30, which is a generally rectangular slot. The periphery of the outer plate 17 is serrated or notched to permit the fingers of an operator to grasp securely the cover plate and turn it relative to the main case 10. Also on the periphery of the outer plate 17 is a jaw 31, for a purpose to be described hereinafter.

As best shown in FIG. 2, on the exterior of the cylindrical wall 20 adjacent the lower end of the film gate 30 is a transverse, semicircular rib 32 adapted to cooperate with a transverse semicircular rib 33 on the interior of the main case 10 and a semicircular rib 34 on the interior of the semicircular wall 13, the ribs 33 and 34 being located adjacent the upper and lower sides of the film slot 14, for purposes to be described hereinafter. Also formed on the inner wall of the bulk film compartment 11, adjacent to the rib 33, is a projecting stop 33a which is engageable by the lower edge of the gate 30 to limit clockwise rotation of the compartment cover 16 relative to the main case, as seen in FIG. 2.

As shown in FIGS. 2 and 3, the spindle 23 is adapted to receive a standard spool 35 having bulk photographic film 36, such as 35 mm. film, wound thereon.

As best shown in FIG. 2, the cassette compartment 12 is provided with a rectangular access opening 38 adapted to be closed by a generally rectangular access door 39 which at its forward end is hinged by a pivot pin 40 to the main case 10. The access door 39 is provided on its inner face with a groove 41 extending around its periphery and adapted to fit over an upstanding rib 42 on the main case to provide a light-tight fit therebetween when the access door is closed, as illustrated in FIG. 2.

Provided in the cassette compartment 12 is a sprocket assembly 44 which includes a shaft 45, one end of which is journaled in a bore 46 in one side wall of the main case and the other end of which extends outwardly through the other side wall of the case, and a cam lever 47 in which it is rigidly fixed. Rotatably mounted on the shaft 45 is a cylindrical sprocket member 48 having two spaced series 49 and 50 of outwardly extending sprocket teeth 51 adapted to engage in conventional perforations 52 along opposite edges of the film 36. Also rigidly mounted on the shaft 45, adjacent its ends, is a pair of actuator elements 54. Provided on the end of the cylindrical sprocket member 48 is a single outwardly extending tooth 55 which engages teeth on the periphery of a gear wheel 56 mounted on a stub shaft 57 journaled in a bore 58 in a wall of the main case 10 and rigidly fixed in a counter dial 59 on the exterior of the main case and provided with a knurled knob 60 for rotating the same. As best shown in FIGS. 8 and 9, the counter dial 59 is provided with numerical indicia to indicate the extent of turning of the gear wheel 56 and the sprocket assembly and, indirectly, the sprocket member 48.

Provided in the cassette compartment 12 is a cassette trough 62 adapted to receive and retain a cassette 63, which may be of the standard type such as sold by Eastman Kodak Company, or the special types sold by Leica, Nikon, Contax, or Pentax. The trough 62 is provided with a transverse slot 64 and a transverse groove 65, either or both of which are adapted to receive projections on certain types of such cassettes to retain the cassette rigidly relative to the main case 10. All of such types of conventional cassettes are provided with a rotatable film spool 66 which may be rotated to wind film thereon. Formed on one side of the main case 10 is a boss 67 which journals an actuating shaft 68, to the outer end of which is fixed a crank 69 provided with a rotatable knurled knob 70, the inner end of the shaft extending into the spool 66 and engaging a cross pin in the spool to permit the spool to be rotated from the outside of the case by rotating the crank 69. On the other side of the main case 10 is a boss 71 which loosely journals a stub shaft 72, to the outer end of which is fixed a knurled knob 73 and to the inner end of which is fixed a circular plate member 74 having projecting lugs 75 adapted to fit into and engage matching recesses in an end of the cover of the cassette 63 if such cassette is of the type providing a rotatable cover to open and close the cassette, as is common with some makes thereof.

On the inside of the access door 39 is a pair of projecting, laterally spaced, guide members 76 each of which engages one side edge of the film 36 and locates it correctly over the sprocket member 48 and positively presses the film down with its perforations 52 over the sprocket teeth 51. A generally similar pair of pressure members 77 is also provided on the inside of the access door 39 to assist in pressing the film 36 down over the sprocket teeth 51. Also provided on the inside of the access door 39 is a transverse projection 78 having a groove adapted to receive a rib 79 of a leveling block 80 which may be snapped into or out of the projection 78. Formed integrally on the bottom of the main case 10 is a pair of projecting feet 81 for supporting the loader on a plane surface, such as a bench. Provided on the actuating shaft 68 is a shim 68a which spaces the adjacent end of the standard cassette from the inner wall of the main case 10 to properly align the cassette with the sprocket assembly 44. To accommodate the special cassettes sold by Leica, which are longer than such standard cassettes, the shim 68a is removed from the loader. The feet 81 are identical in contour and each is formed with a longitudinal semicircular boss 83 which is designed to mate in a similarly shaped groove or slot in a stand (not shown) which can be mounted on a bench or wall to support the film loader in storage or while loading a cassette therein.

In loading my bulk film loader with the bulk film spool 35 and cassette 63, the bulk film compartment cover 16 is first removed from the main case 10. This is accomplished by rotating the knurled knob 27 in a counterclockwise direction to unthread the screw 26 from the spindle 23 to disengage the two, following which the compartment cover may be pulled outwardly (to the right as seen in FIG. 3) to separate it from the main case. The access door 39 is then fully opened from its closed position shown in FIG. 2. This is accomplished by rotating the cam lever 47 from its retracted position shown in FIG. 8 clockwise to its open position shown in FIG. 9. This similarly rotates the shaft 45 and its actuator elements 54 from their positions indicated in FIG. 8 to their upright positions shown in FIG. 9, during which the actuator elements contact the inner wall of the access door 39 and rotate it in a counterclockwise direction about its pivot pin 40 out of sealing engagement with the main case 10 to its position shown in FIG. 9, following which it may be moved by the fingers further in a counterclockwise direction to fully open the access opening 38 to provide access to the cassette compartment 12. The cam lever 47 is then rotated counterclockwise from the position shown in FIG. 9 to its retracted position shown in FIG. 8. My bulk film loader is then ready for loading. In complete darkness the bulk film spool 35 wound conventionally with photographic film 36, normally of the 35 mm. size, is then unwound slightly and the end of the film is passed through the film slot 14 and over the sprocket assembly 44, following which the spool 35 is inserted into the bulk film compartment 11 and onto the spindle 23 to the position shown in FIG. 3. The compartment cover 16 is then inserted into the bulk film compartment 11 to the position generally shown in FIG. 3 with the film gate 30 straddling the film 36, with the film gate generally in alignment with the film slot 14 in the semicircular wall 13. The knurled knob 27 is then rotated in a clockwise direction to thread the screw 26 into the spindle 23 to pull the compartment cover 16 into light-tight engagement with the main case 10. The outer plate 17 of the compartment cover 16 is then rotated clockwise from the open position (FIG. 8) in which the film gate 30 is generally aligned with the film slot 14 to the closed position shown in FIG. 2 in which the film gate 30 is completely out of registry with the slot 14. Toward the end of such movement, the rib 32 on the compartment cover 16 snaps under and past the rib 33 on the inside of the case 10, which can be felt by the operator and indicates that the compartment cover is then in fully closed position, in which the bulk film compartment 11 is completely light-tight. In such closed position the film 36 is positively clamped between the ribs 32 and 33. Since the bulk film compartment 11 at this stage is completely light-tight, the balance of the loading operation may be performed with normal lighting.

The cassette 63, if a standard cassette as shown, is then conventionally taken apart to expose its film spool 66 and the end of the film 36 is secured thereto, as by masking tape. The cassette 63 is then reassembled with its case and end caps over the spool 66 and the film, and the cassette is inserted into the trough 62 to the position shown in FIG. 5. If a special cassette, such as a Contax or Pentax cassette, is employed, instead of the standard cassette 63, it is opened in the conventional manner by rotating its case relative to its spool, the end of the film 36 is attached to the spool, and the special cassette is then inserted into the trough in substantially the position illustrated in FIG. 5. If a special Leica cassette is alternatively employed, the shim 68a is first removed from the loader to accommodate the extra length of such Leica cassette. In inserting any of such cassettes in the film loader, the knurled knob 73 and its associated parts are drawn outwardly relative to the main case 10, against the bias of a spring 75a, which permits the cassette to be inserted into the trough 62 to the position shown in FIG. 5, following which the knob 73 is released to permit it and its associated parts to be moved inwardly by the spring to the position shown in FIG. 5, in which the spool 66 of the cassette 63 is rotatably supported on the shaft 68 and a cylindrical projection 75b on the plate member 74. If a special Contax cassette is used, a projection on its case will fit into the groove 65 to prevent the case of the cassette from turning relative to the main case 10, and if a Pentax or Leica special cassette is used, a projection on its case will fit into the slot 64 to similarly prevent its case from turning relative to the main case. If an Illford special cassette is used alternatively, it is retained in its desired position in the trough 62 by attaching the leveling block 80, shown in FIG. 10, on the inside of the access door 39 by snapping its rib 79 into the groove in the projection 78, so that when the access door is closed, as shown in FIG. 2, the leveling block will engage the case of the Illford cassette used and retain it in its desired position in the trough. Using such special cassettes such as those sold by Contax, Pentax, Leica, and Illford, one or more of the lugs 75 on the plate member 74 will engage with projections on the end of the cassette to permit the cassette to be opened or closed from the outside of the loader by rotating the knurled knob 73 and the plate member. It will thus be understood that my film loader is adaptable to accommodate a wide variety of film cassettes of different types, which is a further object of the invention.

The cam lever 47 is then moved back to its retracted position, shown in FIG. 8, and the access door is moved to its closed position as shown in FIGS. 2 and 8. The compartment cover 16 is then rotated counterclockwise from the position shown in FIG. 9, in which the film gate is closed, to the position shown in FIG. 8, in which the film gate is open. In the latter position, the jaw 31 on the compartment cover 16 overlies and engages the end of the access door 39, to prevent the access door from being opened when the compartment cover 16 is in the position in which the film gate is open, to prevent inadvertent opening of the access door while the film gate is open, which would cause undesirable fogging of the film.

The knurled knob 60 and counter dial 59 are then rotated clockwise until the indicia "0" on the counter dial is indexed at an indicia arrow 82 on the cam lever 47, as illustrated in FIG. 8. The crank 69 is then rotated to similarly rotate the spool 66 of the cassette 63, winding the film 36 from the supply spool 35 onto the cassette spool. Such movement of the film 36 over the sprocket assembly 44 rotates the sprocket member 48 and each time the tooth 55 thereon engages the gear wheel 56 it rotates the latter, and the counter dial 59 connected thereto, clockwise to indicate on the counter dial the number of frames of the film 36 which have been wound onto the cassette 63. Normally cassettes hold only a maximum of 36 frames of standard 35 mm. film, but in loading my device a few extra frames are wound over the sprocket assembly 44 to provide a film leader for the cassette. When the desired number of film frames has been wound onto the cassette 63, the film compartment cover 16 is rotated clockwise to its closed position shown in FIG. 9, following which the cam lever 47 may be moved to its open position as shown in FIG. 9 to release and open the access door 39, following which the access door is fully opened to provide access to the cassette compartment 12. The exposed film between the cassette 63 and the bulk film compartment 11 may then be cut with a pair of scissors to provide a leader of film for the cassette. The cassette 63 may then be removed from the film loader by pulling the shaft 68 outwardly to disengage it from the spool 66 of the cassette and also by pulling outwardly the knurled knob 73 to disengage its bearing from the cassette, following which the cassette may be lifted from the device and a new empty cassette may be substituted therefor for its loading with the bulk film 36. If a special cassette such as those of Contax, Leica, or Pentax, is used, it is closed before the access door 39 is opened, by rotating the knob 73 and the plate member 74.

I do not desire to be limited to the specific preferred embodiment disclosed herein, but desire to be afforded the full scope of the following claims.

I claim:

1. In a bulk film loader, the combination of:
a case, providing
a circular bulk film compartment having one end open and a film cassette compartment separated from the film compartment by a wall having a transverse first slot therein adapted to permit the passage of film from said film compartment to said cassette compartment, the cassette compartment being open on one side;
means in said film compartment for rotatably supporting a film roll;
means in said cassette compartment for supporting a film cassette having a rotatable spool in a position to receive film from the film roll;
means for rotating said spool to draw film from said film roll and wind it on said spool;
a removable cover member, having
a circular apron adapted to fit in said film compartment and an end wall adapted to close the open end of the film compartment, said apron having a second slot adapted to register with said first slot when said cover member is in an opened position relative to said case to permit film to pass from said film compartment to said cassette compartment, said cover member being rotatable relative to said case to a closed position in which said second slot is moved out of registry with said first slot and said apron provides a light-tight closure across said first slot;
a door member adapted to be moved between a closed position in which it closes the opening in said cassette compartment and an open position in which free access is provided to said cassette compartment, the door member being hinged to the case at one end of the door member adjacent to said cassette compartment and remote from said film compartment, such movement being a rotational motion about said hinge; and
means on said cover member engageable with the opposite end of said door member when said door member is in its closed position and said cover member is in its opened position to prevent said door being opened when said door and cover members are in said positions.

2. A device as defined in claim 1, in which:
there are means between the cover member and the case adapted to indicate when the cover member is in its open and closed positions relative to the case and temporarily to retain the cover member in such respective positions.

3. A device as defined by claim 1, in which:
opening means are provided in the cassette compartment engageable with the door when it is in its closed position and operable from the exterior of the case to move the door to its open position.

4. A device as defined by claim 1, in which:
brake means are provided between the cover member and the case for preventing film from being pulled from said film compartment when said second slot is out of registry with said first slot.

5. A device as defined by claim 1, in which:
interchangeable means are provided in said cassette compartment for accommodating film cartridges of diverse dimensions and configurations.

6. A device as defined by claim 1, in which:
locking means are disposed between the cover element and the case for alternatively locking the cover in its opened and closed positions.

7. In a bulk film loader, the combination of:
a case, providing
a circular bulk film compartment having one end open and a film cassette compartment separated from the film compartment by a wall having a transverse first slot therein adapted to permit the passage of film from said film compartment to said cassette compartment, the cassette compartment being open on one side;
means in said film compartment for rotatably supporting a film roll;
means in said cassette compartment for supporting a film cassette having a rotatable spool in a position to receive film from the film roll;
means for rotating said spool to draw film from said film roll and wind it on said spool;

a removable cover member, having
  a circular apron adapted to fit in said film compartment and an end wall adapted to close the open end of the film compartment, said apron having a second slot adapted to register with said first slot when said cover member is in an opened position relative to said case to permit film to pass from said film compartment to said cassette compartment, said cover member being rotatable relative to said case to a closed position in which said second slot is moved out of registry with said first slot and said apron provides a light-tight closure across said first slot;
a door member adapted to be moved between a closed position in which it closes the opening in said cassette compartment and an open position in which free access is provided to said cassette compartment;
means on said cover member engageable with said door member when said door member is in its closed position and said cover member is in its opened position to prevent said door being opened when said door and cover members are in said positions; and
opening means in the cassette compartment engageable with the door when it is in its closed position and operable from the exterior of the case to move the door to its open position,
  the opening means being connected to a rotatable lever member on the exterior of the case by which the opening means may be actuated to move the door to its open position, such lever means engaging the cover member when the latter is in its opened position to prevent rotation of the lever member in such position of the cover member.

8. In a bulk film loader, the combination of:
a case, providing
  a circular bulk film compartment having one end open and a film cassette compartment separated from the film compartment by a wall having a transverse first slot therein adapted to permit the passage of film from said film compartment to said cassette compartment, the cassette compartment being open on one side;
means in said film compartment for rotatably supporting a film roll;
means in said cassette compartment for supporting a film cassette having a rotatable spool in a position to receive film from the film roll;
means for rotating said spool to draw film from said film roll and wind it on said spool;
a removable cover member, having
  a circular apron adapted to fit in said film compartment and an end wall adapted to close the open end of the film compartment, said apron having a second slot adapted to register with said first slot when said cover member is in an opened position relative to said case to permit film to pass from said film compartment to said cassette compartment, said cover member being rotatable relative to said case to a closed position in which said second slot is moved out of registry with said first slot and said apron provides a light-tight closure across said first slot;
a door member adapted to be moved between a closed position in which it closes the opening in said cassette compartment and an open position in which free access is provided to said cassette compartment;
means on said cover member engageable with said door member when said door member is in its closed position and said cover member is in its opened position to prevent said door being opened when said door and cover members are in said positions; and
a sprocket assembly in the cassette compartment, which includes a shaft journaled in the case and having one end extending through one wall of the case, said shaft having a lever member connected thereto on the exterior of said case and movable to rotate said shaft, said shaft having cam means rigidly attached thereto in said cassette compartment and operable by rotation of said shaft to engage and open the door, the shaft having a tubular sprocket member thereon and having teeth engageable with film passing from the film compartment to the cassette compartment, and counter means on the exterior of the case and connected to said sprocket member and rotatable to indicate the number of film frames passing over the sprocket assembly.

* * * * *